（12）United States Patent
Waldl

(10) Patent No.: US 10,432,838 B2
(45) Date of Patent: Oct. 1, 2019

(54) LIGHTING FOR INDUSTRIAL IMAGE PROCESSING

(71) Applicant: B&R INDUSTRIAL AUTOMATION GMBH, Eggelsberg (AT)

(72) Inventor: Andreas Waldl, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 15/365,238

(22) Filed: Nov. 30, 2016

(65) Prior Publication Data

US 2017/0155813 A1 Jun. 1, 2017

(30) Foreign Application Priority Data

Dec. 1, 2015 (AT) .............. A 51030/2015

(51) Int. Cl.
*F21V 14/02* (2006.01)
*F21V 33/00* (2006.01)
*G06K 9/20* (2006.01)
*G06K 9/62* (2006.01)
*G06T 7/00* (2017.01)
*H04N 5/225* (2006.01)

(52) U.S. Cl.
CPC .......... *H04N 5/2256* (2013.01); *F21V 14/02* (2013.01); *F21V 33/0052* (2013.01); *G06K 9/209* (2013.01); *G06K 9/2027* (2013.01); *G06K 9/6202* (2013.01); *G06T 7/0004* (2013.01)

(58) Field of Classification Search
None
See application file for complete search history.

(56) References Cited

U.S. PATENT DOCUMENTS

| 4,645,348 | A | 2/1987 | Dewar et al. |
| 5,690,417 | A | 11/1997 | Polidor et al. |
| 7,336,814 | B2 | 2/2008 | Boca et al. |
| 8,520,067 | B2 | 8/2013 | Ersue |
| 8,803,073 | B2 | 8/2014 | Philippi |
| 9,019,349 | B2 * | 4/2015 | Richardson ............ G06T 7/246 348/155 |

(Continued)

FOREIGN PATENT DOCUMENTS

| DE | 10 2009 016 585 | 10/2010 |
| DE | 196 53 234 | 11/2011 |

(Continued)

OTHER PUBLICATIONS

Europe Office Action conducted in counterpart Europe Appln. No. 16 19 8774 (dated Apr. 28, 2017) (w/ machine translation).

(Continued)

*Primary Examiner* — Reza Aghevli
(74) *Attorney, Agent, or Firm* — Greenblum & Bernstein, P.L.C.

(57) ABSTRACT

Light source (1) for industrial image processing for illuminating an image area (3), the light source (1) having at least one sensor (40) and the at least one sensor (40) being provided for capturing an actual relative position (6) of the light source (1) in relation to a reference plane (10), and that a comparison unit (11) connected to the sensor (40) is provided for comparing the actual relative position (6) of the light source (1) with a defined relative target position (7).

16 Claims, 2 Drawing Sheets

(56) References Cited

U.S. PATENT DOCUMENTS

Figure 1:
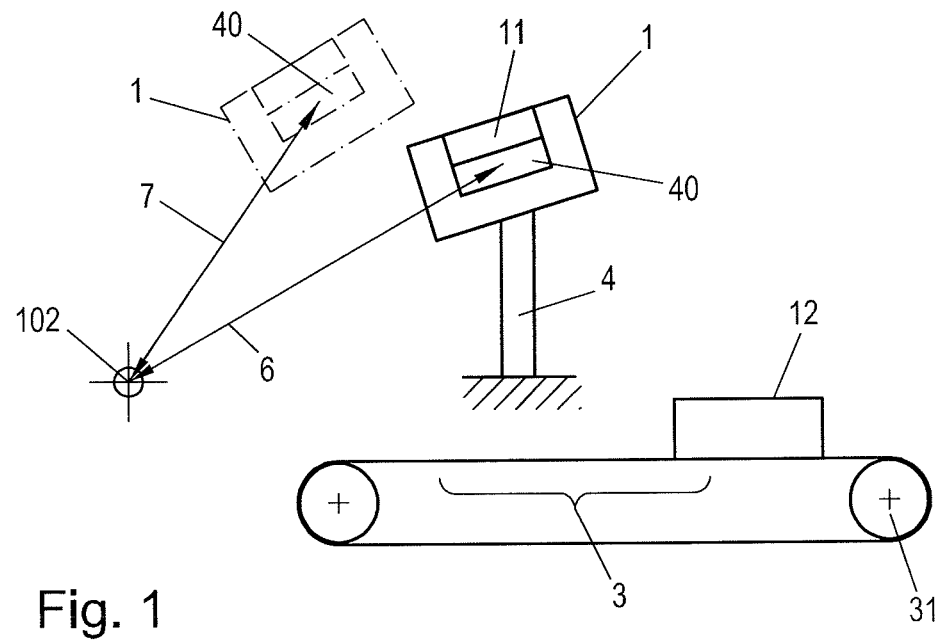

| | | | |
|---|---|---|---|
| 2006/0103755 A1* | 5/2006 | Costigan | H04N 5/2252 348/360 |
| 2007/0014567 A1 | 1/2007 | Rossner et al. | |
| 2008/0118143 A1* | 5/2008 | Gordon | G01B 11/2513 382/154 |
| 2011/0037840 A1 | 2/2011 | Hiltl et al. | |
| 2011/0280558 A1* | 11/2011 | Lu | H04N 5/2256 396/106 |
| 2013/0100333 A1* | 4/2013 | Awatsuji | G03H 1/0443 348/335 |
| 2015/0075018 A1* | 3/2015 | Bridges | G01B 5/008 33/503 |
| 2015/0158429 A1* | 6/2015 | Bort | B60R 1/00 348/148 |
| 2015/0172575 A1* | 6/2015 | Adachi | H04N 5/2354 348/239 |
| 2016/0292866 A1* | 10/2016 | Bloom | G01N 21/17 |
| 2017/0085768 A1* | 3/2017 | Van Der Sijde | H04N 5/2354 |
| 2017/0287147 A1* | 10/2017 | Takahashi | G06T 7/35 |

FOREIGN PATENT DOCUMENTS

| | | |
|---|---|---|
| WO | 2006/019970 | 2/2006 |
| WO | 2006/087123 | 8/2006 |

OTHER PUBLICATIONS

Austria Office Action conducted in Austria Appln. No. A 51030/2015 (dated Nov. 2, 2016).

* cited by examiner

LIGHTING FOR INDUSTRIAL IMAGE PROCESSING

The present application claims priority under 35 U.S.C. § 119(a) of Austrian Application No. A51030/2015 filed on Dec. 1, 2015, the disclosure of which is expressly incorporated by reference herein in its entirety.

The present invention concerns a light source for industrial image processing for illuminating an image area.

The evaluation of measurement objects based on recorded image data is sufficiently known particularly in the field of industrial image processing. In this context, an image processing device employed is also referred to as a "machine vision system". Machine vision systems or industrial image processing are used primarily in automated assembly and production processes for monitoring, quality testing and process control, where they constitute an economical method of automatized optical testing and control.

Industrial image processing usually consists of the illumination of a predefined image area or an object, the image recording by means of a camera and the analysis of the recorded image or, as the case may be, the forwarding of the results to a control unit.

The aim and purpose of using industrial image processing can be, for instance, object and position detection, completeness testing, measurement tasks, and the realization of inspection tasks. Surface testing is likewise an area that can be covered by industrial image processing. The sorting and the therewith associated handling of objects, for example in shipping, is likewise an area of application of such systems.

Implementing industrial image processing in production usually requires thorough planning. Components must be selected to precisely meet the requirements of the particular application. Different tasks demand different performance features of the image processing system. Inspection processes require the ability to detect objects or details, to evaluate a generated image and to decide based thereon whether, for example, a product defect is present. Product assembly or process control, in contrast, demands the ability to detect in an image such as predefined reference markings, for example, which are then used for placing and orienting components or for controlling production processes. With the aid of industrial image processing, a classification or decision for further handling of an object within an assembly or production step can be regulated.

Particularly in the case of the classification just mentioned, it is necessary to ensure that an object or measurement object is detected such that the appropriate decision can actually be made "correctly" as well.

Understandably, the appropriate illumination of the measurement object or of the area in which the measurement object should be detected plays a decisive role in the classification mentioned above.

To facilitate optimal illumination, DE 196 53 234 B4 provides a surface illuminator, for example, that facilitates optimal illumination of a measurement object through selective activation of differently positioned illumination bodies.

However, optimal illumination also requires ensuring that the light source for the industrial image processing is positioned appropriately for its task to be fulfilled. Changes in the position of the light source can understandingly produce corresponding deviations or measurement errors, for instance through the formation of shadows, unwanted reflections, excessively high illumination intensity on the measurement object. Such changes in the position of the light source, or other components, can result from, for example, improper servicing or cleaning work, unintentional misadjustment, but also from sabotage or similar actions.

To facilitate appropriate positioning or to ensure that a position is maintained, suitable rigid mechanical devices can be provided, for example, that facilitate only a single, appropriately precise installation position. However, fixing the installation position in this manner is often not desired, since a change in production, for instance if the measurement object being classified changes, usually requires that changes also be made to the industrial image processing or light source. In this case, repositioning is often very complicated and considerably restricts the flexibility of the industrial image processing system. Furthermore, proper repositioning is not necessarily realized in actuality, which in turn leads to the aforementioned disadvantages.

The present invention seeks to ensure reproducible positioning of the light source for industrial image processing.

According to the invention, this problem is solved in that the light source has at least one sensor and the at least one sensor is provided for capturing an actual relative position of the light source in relation to at least one defined reference point and/or at least one defined reference plane and that a comparison unit connected to the sensor is provided for comparing the actual relative position of the light source with a defined relative target position. This allows the detection of the position of a light source for industrial image processing in relation to a reference plane. The comparison between the defined relative target position and the actual relative length of the light source makes it possible, depending on comparison result, to set the widest variety of actions and, in particular, to also reproducibly ensure the correct positioning of the light source for industrial image processing.

It is advantageously envisioned that the sensor comprises at least an orientation sensor having a defined reference orientation, the orientation sensor is designed for capturing an actual orientation in relation to a reference orientation and that the comparison unit is provided for comparing the actual orientation with a defined target orientation relative to a reference orientation. This allows the spatial orientation of the light source to be detected as positional information. The comparison between the defined orientation and the actual orientation makes it possible, depending on the comparison result, to set the widest variety of actions.

It is advantageously envisioned that the sensor comprises at least a distance sensor, and the distance sensor is provided for capturing at least an actual distance to the at least one defined reference point and/or the at least one defined reference plane and that the comparison unit is provided for comparing the actual distance with a defined target distance to the reference point and/or the reference plane. The comparison between the defined orientation and the actual orientation makes it possible, depending on the comparison result, to set the widest variety of actions.

It is advantageously envisioned that, during normal use, a measurement object is present in the image area and at least part of the surface thereof is provided as reference plane. This makes it possible to capture the distance from the light source to a surface of a measurement object that is to be evaluated with the aid of industrial image processing. This in turn facilitates a reproducible positioning of the light source in relation to the measurement object.

It is furthermore advantageously envisioned that an output unit for outputting a comparison result and connected to the comparison unit is provided. A comparison result thus output can now be used for a wide variety of purposes. To this end, the comparison result can also contain information concerning a deviation of the actual orientation or, as the case may be, of the actual distance of the light source to the reference plane from the corresponding target values, thereby also facilitating in particular an automated positioning of the light source.

It is also advantageously envisioned that a camera for industrial image processing is connected to the light source. The aforementioned advantages of capturing the position or, as the case may be, orientation and distance of the light source to a point on a reference plane are also realized in this manner for a camera used for industrial image processing.

It is also advantageously envisioned that a positioning unit connected to the light source is provided for the spatial positioning of the light source as a function of the comparison result. This allows corresponding deviations between the actual relative position and the defined target position or, as the case may be, the corresponding orientations, orientation or distances of the light source to the reference plane or a reference point to be compensated or the light source to be repositioned and adjusted in a simple manner.

With respect to the aforementioned camera, a compensation unit for manipulating the image data generated by the camera at least as a function of the comparison result can be provided. This makes it possible, depending on a possible difference between actual position, orientation and/or position of the camera and the appropriate target values to adapt or correct the image data generated by the camera accordingly.

The problem of reproducibly positioning the light source for industrial image processing is additionally solved by an appropriate method. According to this method, it is envisioned that the aforementioned light source is used appropriately, as the case may be in advantageous embodiments thereof.

The present invention is explained in greater detail below with reference to FIGS. 1 and 4, which schematically show advantageous configurations of the invention as examples without limiting its scope. Illustrated are FIG. 1 the light source in a general spatial position, FIG. 2 the light source in an advantageous embodiment, shown in a general spatial position, FIG. 3 the light source in an especially advantageous position, FIG. 4 an advantageous combination of the light source with a camera.

FIG. 1 schematically shows a light source 1 as it is used for illuminating an image area 3 for industrial image processing. For example, the image area 3 just mentioned is located on a conveyor belt 31 on which measurement objects 12 are illuminated during an automated assembly and production process, for example in the course of quality testing. The image area 3 is thus formed by, for example, a plane on the conveyor belt 31 or also on a measurement object 12 itself.

Figure 2:
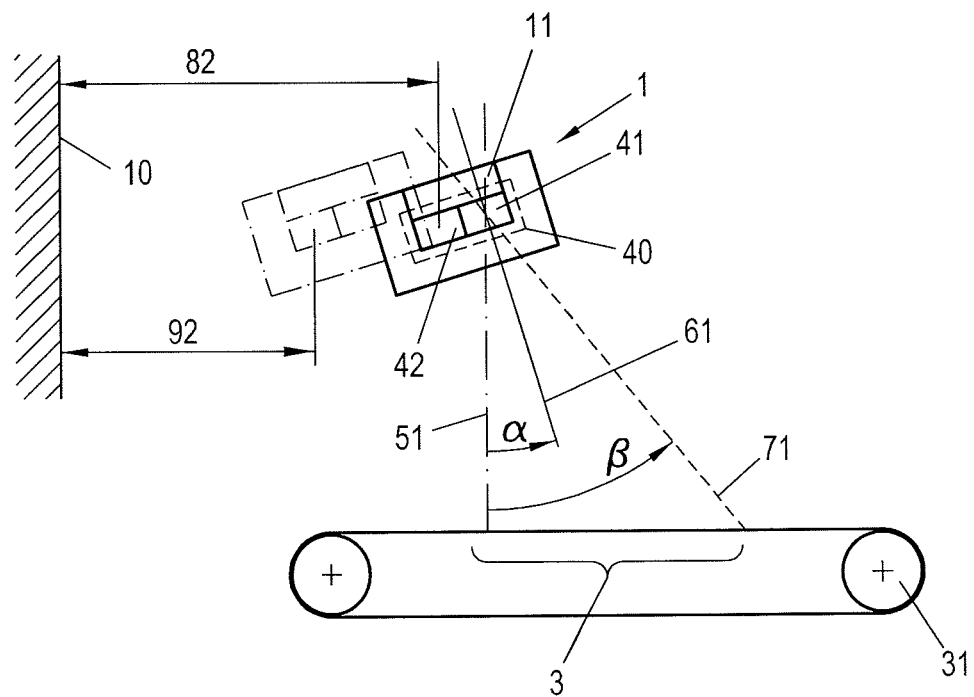

According to the invention, the light source 1 used for this purpose has at least one sensor 40. The at least one sensor 40 functions to capture an actual relative position 6 of the light source 1 in relation to at least one defined reference point 102 and/or at least one defined reference plane 10 (FIG. 2). A comparison unit (position comparer) 11 connected to the sensor 40 is provided for comparing the actual relative position 6 of the light source 1 with a defined relative reference position 7. Depending on the assembly device 4 on which the light source 1 is mounted, there can be a different number of possible degrees of freedom for movement of the light source 1 in space. The assembly device 4 can allow one to six degrees of freedom for the movement of the light source 1. The use of the at least one sensor 40 specified above allows the detection of the position of the light source 1 for industrial image processing relative to a defined reference point 102 or also a defined reference plane 10. The comparison between the defined relative target position 7 and the actual relative position 6 of the light source 1 makes it possible to set a wide variety of actions, depending on the comparison result. In FIG. 1, the defined relative target position 7 of the light source is only indicated schematically with dashed lines and the position indicated only relative to a reference point 102.

For the sensor 40, a number of known sensors can be advantageously used that are sufficiently known in a diverse range of variants and are therefore not described in greater detail here. Sensor selection is governed primarily by the possible degrees of freedom allowed by the assembly device 4. It has been found that the advantages of the reproducible positioning with the aid of the sensors can be enhanced all the more, the greater the degree of freedom the assembly device employed possesses.

In FIG. 2, which already shows an advantageous embodiment but without an assembly device 4, it is clear that the sensor 40 can comprise at least an orientation sensor 41 with a defined reference orientation 51. In this example, the orientation sensor 41 is designed for capturing an actual orientation 61 in relation to the reference orientation 51. Again, a comparison unit 11 connected to the orientation sensor 41 and serving to compare the actual orientation 61 with a defined target orientation 71 in relation to the reference orientation 51 can be used.

The reference orientation 51 just mentioned is to be understood as reference orientation of the orientation sensor 41 in space, it also being possible to refer to this reference orientation as zero position. It is called zero position because a deviation angle α is equal to zero, if the orientation sensor 41 is in the reference orientation 51, i.e. the actual orientation 61 matches the reference orientation 51. FIG. 2 shows an actual orientation 61 of the orientation sensor 41 or, as the sensor 40 is installed in a stationary manner in relation to the light source 1, of the light source 1 connected thereto, where a deviation angle α not equal to zero is visible. Of course, it should be kept in mind here that there could be up to three rotational degrees of freedom in space for the light source 1 depending on the assembly device 4 provided. If the light source 1 is also arranged such that it is movable in a translatory manner, i.e. for example secured not just to a rotational or ball joint, but additionally to a rail system, it gives rise to further translatory degrees of freedom in addition to the rotational degrees of freedom just mentioned, which can result in up to six degrees of freedom in a known manner.

FIG. 2 also shows in an especially advantageous manner that the sensor 40 comprises at least one distance sensor 42, the distance sensor 42 being provided for capturing at least one actual distance 82 to the at least one defined reference point 102 and/or the at least one defined reference plane 10. The distance sensor 42 can be provided in addition to or alternatively to the orientation sensor 41. Furthermore, the at least one distance sensor 42 is connected to the comparison unit 11 for comparing the actual distance 82 against a defined target distance 92 to the reference point 102 and/or the reference plane 10. For the sake of simplicity, only the reference plane 10 is represented in FIG. 2.

In contrast to what is shown, the comparison unit 11 can also be provided in the form of an external module that is connected, for example, wirelessly or by wire to the light source 1 or, as the case may be, the orientation sensor 41 and/or the distance sensor 42.

As already mentioned above, a precise and above all reproducible positioning of the light source 1 is necessary according to the particular industrial image processing tasks to be performed. This task-dependent position is defined by the target orientation 71 for one, this orientation being relative to the reference orientation 51. FIG. 2 also depicts a exemplary target angle β. Of course, the reference orientation 51, the actual orientation 61 and the target orientation 71 as well as the corresponding deviation angle α and target angle β in the representation chosen in FIG. 2 are merely shown as examples for only one spatial plane. Because geometric relationships of this type are of course possible for further spatial planes corresponding to the industrial imaging tasks to be satisfied or, as the case may be, depending on the installation situation. Therefore, multiple orientation sensors 41, distance sensors 42 and corresponding reference planes 10 or, as the case may be, reference points 102, may be provided.

In FIG. 2, the light source 1 and the distance sensor 42 connected thereto are shown at an actual distance 82 to the reference plane 10. Of course, the reference plane 10 can be selected as desired and could, as shown in the representation according to FIG. 2, be formed by the surface of a wall element or any desired stationary component, for example. As already mentioned, multiple distance sensors 42 and corresponding reference planes 10 could naturally also be provided according to the degree of freedom available.

As already mentioned above in general terms regarding the sensor 40, a number of known sensors can be advantageously used also for the orientation sensor 41 or, as the case may be, the distance sensor 42 that are sufficiently known in a diverse range of variants and are therefore not described in greater detail here.

FIG. 2 shows a difference between actual orientation 61 and target orientation 71 as well as between deviation angle α and target angle β. Likewise, the actual distance 82 deviates from the defined target distance 92 to the reference plane 10. FIG. 2 thus illustrates a situation in which the positioning of the light source 1 ensures no optimal or desired illumination of the image area 3.

Figure 3:
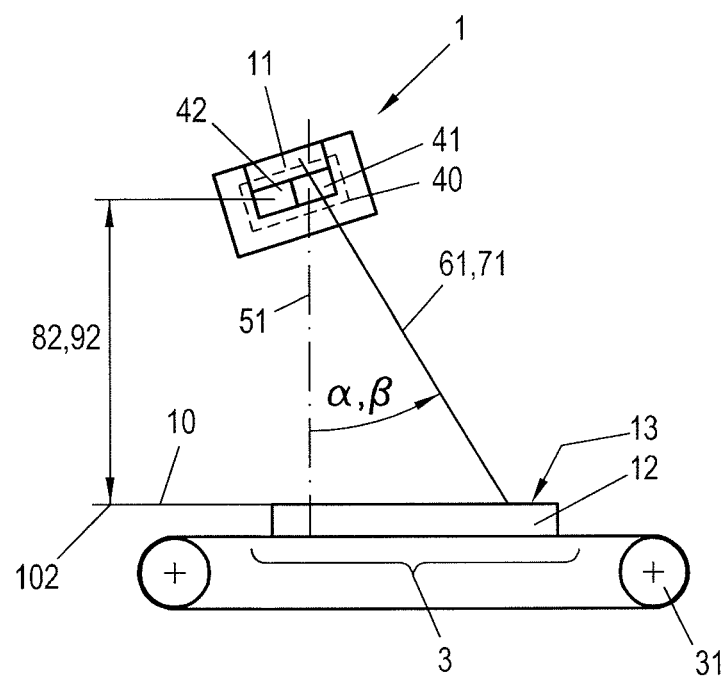

FIG. 3, in contrast, shows the light source 1 in the desired orientation. In this example, the actual orientation 61 and target orientation 71 coincide or, in other words, there is no difference between the deviation angle α and the target angle β. Furthermore, a measurement object 12 is present in the image area 3, and at least a portion of the surface 13 thereof is used as reference plane 10. This allows to capture the distance of the light source 1 to the surface 13 of the measurement object 12, which is supposed to be evaluated with the aid of industrial image processing, and facilitates the reproducible positioning in relation to the measurement object 12.

In the representation shown in FIG. 3, the actual distance 82 is also equal to the defined target distance 92 to the reference plane 10 or, as the case may be, the reference point 102. In contrast to FIG. 2, the light source 1 is thus positioned for industrial image processing as envisioned. A comparison of the orientations 61 and 71 as well as of the distances 82 and 92 conducted by the comparison unit 11 would therefore not result in a deviation.

According to the invention, an output unit (output) 14 connected to the comparison unit 11 can be provided for outputting a comparison result 15. The comparison result 15 can consist only of position matches or position does not match, but can also provide information on the particular deviation. This output unit 14, which is represented only schematically in FIG. 4, can comprise a wide variety of exemplary embodiments. For example, an acoustic signal is conceivable that indicates a non-optimal positioning of the light source 1, as is illustrated in FIG. 2. Likewise, an optical output of the comparison result 15 or the magnitude and direction of the deviation are naturally conceivable. Such a visualization of the deviation can be realized by means of LEDs, a display or other measures on the light source 1 itself or on a separate visualization in reach of vision of the light source 1 to make the manual positioning of the light source 1 easier. The output unit 14, however, can also comprise a data communication interface, e.g. a connection to a data bus, for the purpose of transmitting the comparison result 15 to a superordinate control device via the data bus.

A positioning unit (spatial positioner) 16 that allows spatial positioning of the light source 1 as a function of the comparison result 15 can be provided on the assembly device 4 in an especially advantageous manner. The positioning unit 16 is shown only as an example in the form of a rail system with the corresponding translatory movement directions illustrated by arrows in FIG. 4. The positioning unit 16 may of course facilitate also rotational movements. For positioning, a position control unit 20 can be provided that receives and evaluates the comparison result 15 and activates the positioning unit 16 for the purpose of compensating the undesired deviation between actual relative position 6 and the target position 7, as indicated in FIG. 4.

Figure 4:
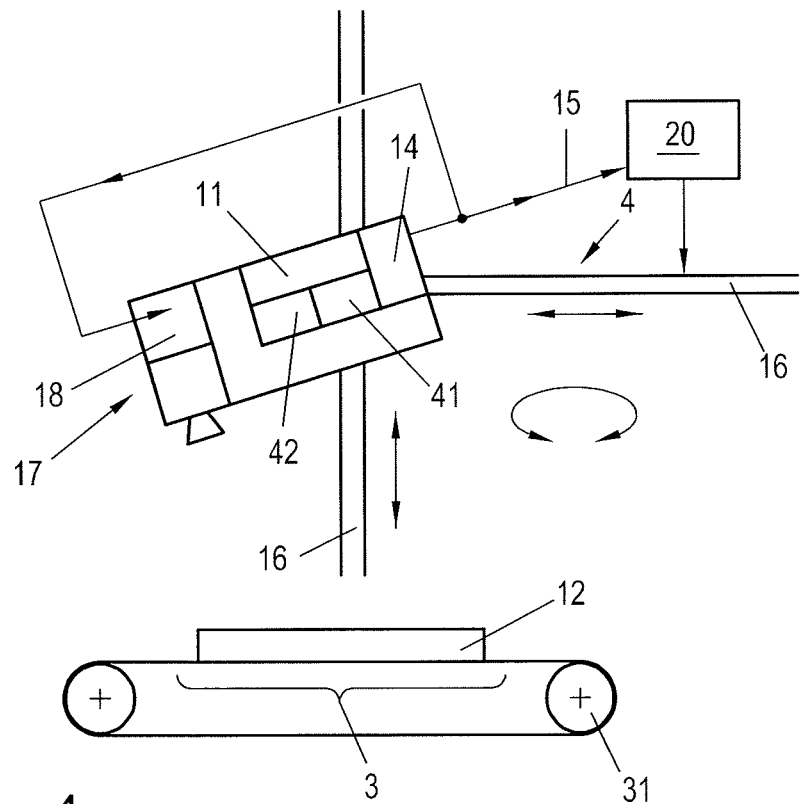

FIG. 4 also schematically shows that a camera 17 for industrial image processing is connected to the light source 1. In this manner, optimally reproducible positioning can also be ensured for the camera 17 of a system for industrial image processing through the detection of the actual relative position 6, the actual orientation 61 and/or an actual distance 82 to a reference plane 10 or a reference point 102.

As already mentioned, a diverse range of sensor types can be used for the sensor 40. When light source 1 and camera are combined 17, a triangulation method, for example, can be used in place of a distance sensor 42 for determining the actual distance 82. For example, a laser source connected to the light source 1 can generate a point of light in the image area 3 in a known manner in this scenario. If distance between camera 17 and laser source is known, the actual distance of the combined light source 1 and camera 17 to a plane in the image area 3 or a point within said area can be ascertained using the triangulation method just mentioned. Of course, the plane or point can be a reference plane 10 or reference point 102, respectively.

The aforementioned camera 17 for industrial image processing can of course also be what is referred to as a "smart camera". In a known manner, a "smart camera" possesses its own internal processor by means of which the image captured by the camera 17 is processed. Subsequently, it is usually not the image itself that is output by a "smart camera", which is then processed externally, but rather the information based thereon, i.e. whether, for example, an imaged component meets specifications or not or how large a measured value is. Of course, the image recording of a smart camera can also be read out, for example for archiving the image data recorded thereby. A smart camera can also be used to output data, for example by capturing the image of a barcode or similar item. In this application, any mention of the camera 17 can of course also cover a "smart camera".

If now, for example, the comparison result 15 bears the information that the actual orientation 6 of the camera 17 and/or the actual distance 82 to a reference plane 10 deviates from the target orientation 71 and/or the target distance 92, it can be expected that the generated image data is corrupted. In this case, the measurement object 12 would be represented as, for example, distorted, enlarged or reduced in scale. The camera 17 shown in FIG. 3 therefore advantageously has a compensation unit (image data manipulator) 18. This compensation unit 18 allows the image data generated by the camera 17 to be manipulated, at least depending on the comparison result 15, for the purpose of compensating such corruptions.

For the example specified, manipulation means that the image data is accordingly rectified, enlarged or reduced depending on the comparison result 15 of the recognized measurement object 12. For example, an excessively small or excessively large actual distance 82 between the camera 17 and reference plane 10 or a reference point 102 is compensated in this manner. Of course, the manipulation of the image data generated by the camera 17 as just described can also be performed in downstream image processing or, if an already mentioned smart camera is used, the results delivered by the smart camera can also be manipulated.

In this way, the reproducible positioning of the light source 1 for the industrial image processing and the components connected thereto, such as a camera 17 for example, can be ensured for the purpose of thus allowing, for example, an optimally reliable evaluation of a measurement object 12.

The invention claimed is:

1. A light source for industrial image processing for illuminating an image area, comprising:
    at least one sensor configured for capturing an actual relative position of the light source in relation to at least one defined reference, which is at least one of: at least one defined reference point or at least one defined reference plane; and
    a position comparer, which is connected to the at least one sensor, being configured for comparing the actual relative position of the light source with a defined relative target position.

2. The light source according to claim 1, wherein the sensor comprises at least an orientation sensor having a defined reference orientation,
    wherein the at least one orientation sensor is designed for capturing an actual orientation in relation to the reference orientation and
    wherein the position comparer is provided for comparing the actual orientation with a defined target orientation relative to the reference orientation.

3. The light source according to claim 1, wherein the sensor comprises at least a distance sensor for capturing at least an actual distance to the at least one defined reference and
    wherein the position comparer is provided for comparing the actual distance with a defined target distance to the at least one reference.

4. The light source according to claim 1, wherein during normal use of the light source, a measurement object is present in the image area and at least part of a surface of the measurement object is provided as the at least one reference.

5. The light source according to claim 1, further comprising an output for outputting a comparison result being connected to the position comparer.

6. The light source according to claim 1, wherein the light source is connected to a camera for industrial image processing.

7. The light source according to claim 6, further comprising an image data manipulator for manipulating the image data generated by the camera as a function of the comparison result.

8. The light source according to claim 1, further comprising a spatial positioner connected to the light source for spatial positioning of the light source as a function of the comparison result.

9. A method for operating a light source for industrial image processing for illuminating an image area, comprising:
    capturing with at least one sensor of the light source an actual relative position of the light source in relation to at least one defined reference, which is at least one of: at least one defined reference point or at least one defined reference plane; and
    comparing, with a position comparer connected to the sensor, the actual relative position of the light source with a defined relative target position.

10. The method according to claim 9, wherein the sensor comprises at least an orientation sensor having a defined reference orientation,
    wherein the orientation sensor captures an actual orientation in relation to a reference orientation and
    wherein the position comparer compares the actual orientation with a defined target orientation relative to a reference orientation.

11. The method according to claim 9, wherein the sensor comprises at least a distance sensor that captures at least an actual distance to the at least one defined reference and
    wherein the position comparer compares the actual distance with a defined target distance to the at least one reference.

12. The method according to claim 9, wherein during normal use, a measurement object is present in the image area and at least part of a surface of the measurement object is used as the at least one reference.

13. The method according to claim 9, further comprising outputting, via an output connected to the position comparer, a comparison result.

14. The method according to claim 9, wherein a camera for industrial image processing is connected to the light source.

15. The method according to claim 14, further comprising manipulating image data generated by the camera via an image data manipulator at least as a function of the comparison result.

16. The method according to claim 9, wherein the light source is spatially positioned as a function of the comparison result.

* * * * *